K. MAYBACH.
FRICTION COUPLING AND BRAKE.
APPLICATION FILED JAN. 15, 1908.
907,074.
Patented Dec. 15, 1908.
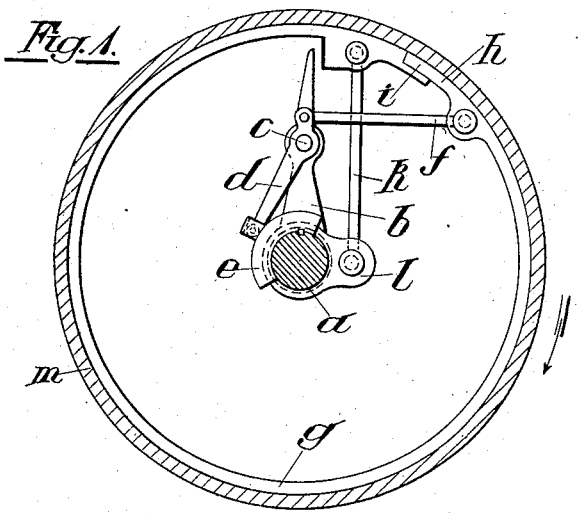
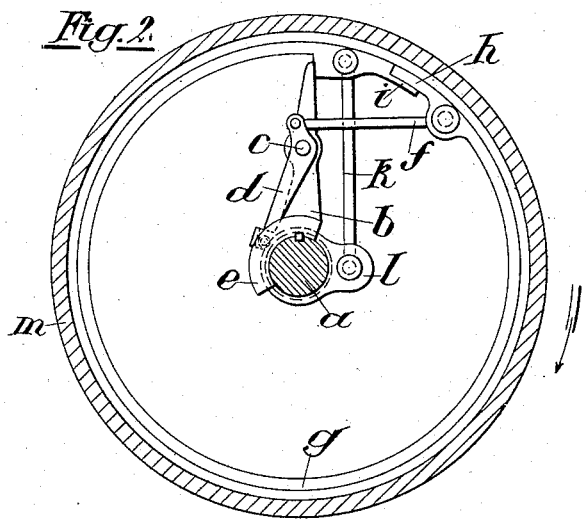
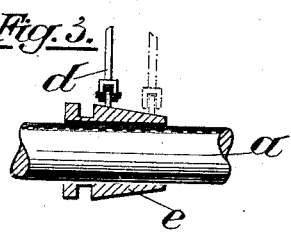

UNITED STATES PATENT OFFICE.

KARL MAYBACH, OF PARIS, FRANCE.

FRICTION COUPLING AND BRAKE.

No. 907,074.  Specification of Letters Patent.  Patented Dec. 15, 1908.

Application filed January 15, 1908. Serial No. 410,939.

*To all whom it may concern:*

Be it known that I, KARL MAYBACH, a citizen of the German Empire, residing at Paris, France, have invented certain new and useful Improvements in Friction Couplings and Brakes; and I do hereby declare the following to be a full, clear, and exact description of the invention, such as will enable others skilled in the art to which it appertains to make and use the same.

This invention relates to a hollow cylindrical friction coupling and brake which differs from other such couplings by its extraordinary effectiveness without requiring a corresponding expenditure of power.

The object of the invention consists in the arrangement of an open friction ring in a hollow cylinder and connected with two push cranks fast on the driven shaft, in such a way, that, by means of the mechanism for throwing into and out of engagement arranged on the one push crank, one brake ring end is pressed against the hollow cylinder and in consequence of the brake ring being carried with the hollow cylinder which results when it is pressed on the hollow cylinder, the other end of the brake ring is automatically pressed sharply against the hollow cylinder by means of a coupling piece connecting it with the second push crank. After the release of the coupling the friction ring contracts in such a way that it stands away from the hollow cylinder uniformly all round. By a suitable arrangement of the coupling in accordance with this invention it may also be employed as a brake, whereby the advantages of its great brake power with a minimum expenditure of power come particularly into play.

Band brakes or couplings are already known in which the ends of the band are pressed apart, however all these have the drawback that all the connecting pressure on the driven shaft is transmitted by rigid connections, while this is operated by a jointed connection in the present invention by means of which the end of the band is sharply pressed on the friction body. The power obtained is also so great that the arrangement of the brake band in several loops as hitherto, may be dispensed with, a single loop sufficing therefor.

The object of this invention is shown in the accompanying drawings as an example.

Figure 1 is a view of the friction coupling in the coupled position. Fig. 2, in the released position, and Fig. 3 is an axial section of an example of construction of a member employed for coupling.

A push crank $b$ is arranged on the axle $a$ which is to be driven, on which crank a double-armed lever $d$ pivotal on a pin $c$ and serving for throwing the coupling into and out of action is mounted, which lever may be caused to turn by hand by suitable means, for instance, a conically tapering axially displaceable slide piece $e$. The lever $d$ is connected by a rod $f$ with one end $h$ of the open brake ring $g$, which is intended to bear against a hollow cylinder $m$ revolving in the direction indicated by the arrow. The other end $i$ of the brake ring $g$ is connected by a link piece $k$ with a second push crank $l$ fixed on the axle $a$. On the coupling being engaged, that is to say on the slide piece being displaced, the end $h$ of the brake ring $g$ is first pressed in the ordinary manner on the hollow cylinder $m$, the brake ring $g$ is thereby turned with it and its end $i$ in consequence of the action of the coupling piece $k$ pressed tightly on the hollow cylinder $m$. An advantageous application of power is thereby exerted, without the operation of the slide piece $e$ necessitating an appreciable expenditure of power. The ends $h$ and $i$ of the brake ring are so arranged that they may be displaced one in another with the object that when the brake ring is released, the released end $h$ acts immediately on the other end $i$ of the brake ring, and the brake ring is immediately and uniformly drawn off the hollow cylinder. In the uncoupled position the brake ring stands away uniformly all round from the hollow cylinder $g$.

In practice the arrangement as a coupling is preferably made symmetrical and two semicircular bands are employed.

Having now particularly described and ascertained the nature of my said invention and in what manner the same is to be performed, I declare that what I claim is:—

The combination of a rotary member, a cylindrical rotary member surrounding the first-named rotary member, a conical controlling part rotative with but movable longitudinally of said first-named member, a split ring inclosed within the cylindrical member, a lever pivoted on said first-named member on an axis parallel with the axis of said first-named member, and crossing links, one of said links connecting one end of the lever with one end portion of the split ring and the other link connecting said first-named member with the other end portion of said ring, substantially as described.

In testimony whereof I affix my signature, in presence of two witnesses.

KARL MAYBACH.

Witnesses:
   HANSON C. COXE,
   MAURICE ROUX.